United States Patent Office 3,106,664
Patented Oct. 8, 1963

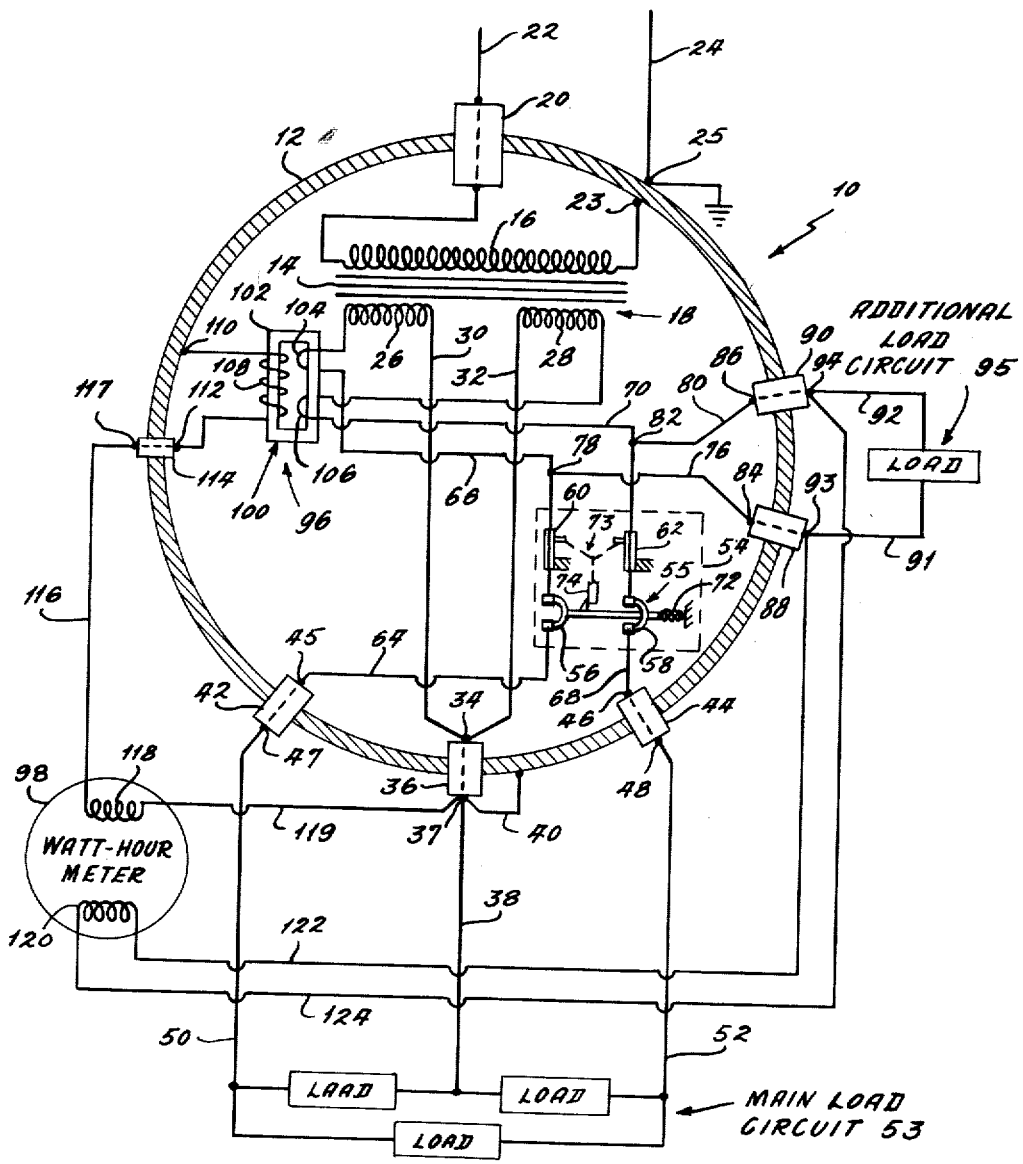

3,106,664
TRANSFORMER PROTECTION SYSTEM TO
INSURE LOAD SERVICE OPERATION
Howard B. Keath, Clayton, Mo., assignor to Wagner Electric Corporation, St. Louis, Mo., a corporation of Delaware
Filed May 1, 1961, Ser. No. 106,845
18 Claims. (Cl. 317—15)

This invention relates to power transmission and more particularly to electrical transformer apparatus for supplying power to load circuits.

It is common practice to employ protective circuit breakers between a transformer and its load circuits in order to prevent damage to the transformer upon the occurrence of overload conditions. In many cases, however, it is necessary or highly desirable to have a particular load supplied power continuously or without interruption even if the power supplied to other loads connected to the transformer is interrupted. For example, in many rural areas, water is often supplied for use from wells by electric motor driven well pumping apparatus. Such well pumping apparatus as well as other load circuits are usually supplied power from a conventional transformer such as a pole-mounted distribution transformer. Since it is common practice to employ protective circuit breakers between the transformer windings and load circuits in order to prevent damage to the transformer upon the occurrence of overload conditions, an overload or a short circuit in a load circuit will cause the circuit breaker to disconnect the total load including the well pumping apparatus from the transformer. This presents a hazardous situation in that, should a short circuit condition in a load circuit result from or cause a fire, the power supplied to the well pumping apparatus would be interrupted by the actuation of the circuit breaker and water would not be available for extinguishing the fire.

If it is desired to connect the well pumping circuit ahead of the transformer circuit breaker in order to avoid the abovementioned hazard, an external circuit breaker can be mounted, for example, on the pole near the transformer, and well pumping circuit leads connected to circuit points between the transformer and the breakers; however, this arrangement requires a considerable number of external terminal connections, leads, separate parts and mountings, and thus considerably increases the installation time and cost. Also, the external circuit breaker, in such an arrangement, would be responsive only to the load current as opposed to the more desirable type of circuit breaker which is disposed in the transformer casing and responsive to the temperature of the transformer or fluid dielectric of the transformer as well as load current. As is well-known, an internally connected circuit breaker disposed within the transformer casing can be made responsive to the copper temperature of the transformer by correlating the effects of loads over an extended period of time, as indicated by the temperature of the fluid dielectric, and the instanteous loads, as indicated by the instanteous load currents. The internally disposed circuit breakers, in this way, can be made to interrupt service only when dangerously high copper temperatures are reached, as opposed to the unnecessary interruption of service due to the occurrence of a short-time overload. External circuit breakers are also usually more expensive since they require all-weather enclosures and additional installation time.

Furthermore, in some cases, current transformers for providing a reduced value of load current are used in order that a watt-hour meter of lower rating and cost may be employed. This, of course, adds to the installation time because of the additional lead connections and the mounting of the current transformer.

It is therefore a general object of the present invention to provide a transformer apparatus which eliminates or overcomes to a large degree the abovementioned disadvantages.

Another object is to provide a transformer provided with transformer terminal means wherein a pair of load circuits may be readily connected to the transformer terminal means and supplied power independently of each other.

Another object of the present invention is to provide transformer apparatus for supplying power to a main load circuit through a protective circuit interrupting device and wherein another load circuit may be readily connected to the transformer apparatus and supplied power independently of the circuit interrupting device.

Another object is to provide a transformer having a circuit breaker disposed in the transformer casing for interrupting the supply of power to one load circuit upon the occurrence of predetermined conditions, and means whereby an additional load circuit may be connected directly to the transformer and continuously supplied power therefrom even if the circuit breaker interrupts the power supplied to the one load circuit.

Another object is to provide transformer apparatus including a casing enclosing the transformer core and windings, and wherein there is provided current responsive means in the casing for supplying current responsive to the load current to an external circuit whereby the use of an external current responsive device and the mounting thereof is obviated.

Still another object is to provide a transformer having a circuit breaker disposed in the transformer casing for interrupting the supply of power to a main load circuit upon the occurrence of overload conditions, and terminal connections for supplying power to an additional load circuit independently of the circuit breaker, and wherein means are provided whereby a watt-hour meter may be easily and quickly connected with the transformer for metering the watt-hours utilized by both of the load circuits.

In accordance with one aspect of the present invention, a transformer apparatus is provided with a circuit arrangement including circuit connections for supplying power to a main load circuit through a protective current interrupting device and with transformer connection means for supplying power to an additional load circuit; the additional load circuit being connected in by-passing relation with the circuit breaker so that power is supplied thereto independently of the circuit breaker. Another aspect of the present invention is in the provision of a current responsive device connected within the transformer casing for supplying current to an external metering circuit for metering the total watt-hours delivered by the transformer.

Further objects and advantages of the present invention will be apparent from the following detailed description and drawing.

The single figure of the accompanying drawing is a diagrammatic illustration of an electrical supply apparatus embodying the present invention.

Referring to the drawing, an electrical transformer 10 is shown including a transformer casing 12 containing a dielectric fluid, such as transformer oil, in which is immersed a transformer core 14 provided with a primary winding 16 and a secondary winding 18. The particular transformer shown is of the pole-mounted distribution type utilizing a single primary bushing 20 sealably mounted in the usual manner to the casing. By means of a conductor (shown by a dashed-line) passing through insulating bushing 20 and the terminals of the bushing, one end of the primary winding 16 is connected to a high voltage supply line 22. The other end of the primary winding is connected to a terminal 23 conductively connected to the casing 12. A voltage supply return lead 24 is connected to the casing 12 at a grounding terminal 25. The secondary winding 18 includes a pair of windings or winding sections or coils 26 and 28 having their adjacent ends connected respectively by leads 30 and 32 to an internal transformer or bushing terminal 34 of a secondary bushing 36 sealably mounted to casing 12. Terminal 34 is connected by a conductor through bushing 36 to an external transformer or bushing terminal 37 to which is connected a load circuit lead 38. Lead 38 is the secondary ground or neutral lead, it being shown grounded to the casing 12 by a lead 40. Sealably mounted to casing 12 are secondary bushings 42 and 44 having internal bushing terminals 45 and 46, respectively, connected by conductors through the bushings to external bushing terminals 47 and 48, respectively. Load circuit leads 50 and 52 are respectively connected to bushing terminals 47 and 48. Leads 38, 50 and 52 provide, for example, a three-wire low voltage distribution circuit, such as a 120/240 volt circuit, for providing electrical service to a main load circuit indicated generally at 53.

A protective circuit interrupting device, shown as a circuit breaker 54, is disposed in the transformer casing 12 in the fluid dielectric and connected in series with the secondary winding 18 for disconnecting the transformer from the low voltage distribution circuit upon predetermined load conditions of the transformer. Circuit breaker 54 includes a two-pole switch 55 having circuit interrupting switches or switch contacts 56 and 58 mechanically connected to operate together. The circuit breaker 54 is provided with a pair of thermally responsive elements shown as bimetal elements 60 and 62, for effecting the actuation of the switch contacts 56 and 58.

Bushing terminal 45 is connected to contacts 56 of the circuit breaker by a lead 64 and through series connected bimetal element 60 and a lead 66 to the lefthand end of secondary winding section 26. The bushing terminal 46 is connected to the other circuit breaker switch contacts 58 by a lead 68 and through series connected bimetal element 62 to the righthand end of secondary winding section 28 by a lead 70. With these connections, current flowing in load lead 50 will flow in lead 64 through closed switch contacts 56, bimetal element 60, lead 66 and winding section 26. Similarly, current flowing in load lead 52 will flow in lead 68, through closed contacts 58, bimetal element 62, lead 70 and winding section 28.

Various types of thermally responsive circuit breakers are commercially available and the details of construction have been omitted herein to simplify the drawing and facilitate the understanding of the invention. Thus, the circuit breaker 54 is shown simply as having a spring 72 for biasing the contacts 56 and 58 to their open position upon predetermined conditions, and a switch operating mechanism 73 including a latch 74 acting to maintain the contacts closed under normal operating conditions. Upon an overload condition, one or the other of the bimetal elements 60 and 62 causes the latch 74 to release the biased switch contacts 56 and 58 so that they move to their open position to thereby remove the main load circuit from the transformer. In addition to being responsive to the current flowing in load circuit leads 50 and 52, the bimetal elements 60 and 62, since they are disposed in the transformer casing 12, are also responsive to the temperature of the transformer or fluid dielectric in the casing.

In the drawing, one end of a lead 76 is shown connected to lead 66 at a juncture 78 located between the lefthand end of secondary winding section 26 and switch contacts 56 of the circuit breaker. Another lead 80 has one end connected to lead 70 at a juncture 82 located between the righthand end of secondary winding section 28 and switch contacts 58 of the circuit breaker. The other ends of leads 76 and 80 are respectively connected to a pair of internal transformer or bushing terminals 84 and 86 of a pair of additional bushings 88 and 90 sealably mounted to casing 12. Terminals 84 and 86 are respectively connected by conductors through bushings 88 and 90 to a pair of load leads 91 and 92 which are connected to external bushing terminals 93 and 94 of the bushings 88 and 90. With these connections, the voltage across leads 91 and 92 will be equal to the sum of the voltages of windings sections 26 and 28. Leads 91 and 92 are connected to an additional load circuit 95 which may include an electric motor of a well pumping apparatus (not shown).

Since the additional load circuit 95 is connected by leads 76 and 80 between junctures 78 and 82, the load circuit 95 is connected to the secondary winding 18 ahead of or in by-passing relation with the normally closed switch contacts 56 and 58 of circuit breaker 54. Thus, the additional load circuit 95 is connected in parallel with the main load circuit 53 and its series connected circuit breaker 54. With this arrangement, even though the circuit breaker functions to remove the main load circuit from the transformer in the event of an overload condition, the supply of power to the additional load circuit 95 will not be interrupted. Thus, for example, where well pumping apparatus is connected in additional load circuit 95 and a fire causes or results from a short circuit condition in the main load circuit, the circuit breaker will operate to disconnect the main load circuit from the transformer but electric service to the well pumping apparatus in the additional load circuit will be maintained so that water will be available for extinguishing the fire.

Disposed also within the transformer casing 12 is a current responsive circuit indicated generally at 96 which is connected to be responsive to the currents flowing in both the main load circuit 53 and the additional load circuit 95. Circuit 96 is shown connected to supply its output current to an external measuring or metering circuit which is shown including a conventional watt-hour meter, indicated diagrammatically at 98, for metering the watt-hours used by both of the load circuits. The watt-hour meter 98 may be mounted on the same pole with the transformer 10, and at a level suitable for reading the meter. The circuit 96 includes a current transformer 100 coupled to both secondary winding sections such as by coupling it to leads 66 and 70 to thereby be responsive to the sum of the currents flowing in the secondary winding sections 26 and 28 or the total load current drawn from the transformer. The current transformer 100 is shown including a magnetic core 102 having a current transformer primary winding 104 connected in series with winding section 26 between the lefthand end thereof and the juncture 78, and a primary winding 106 connected in series with winding section 28 between the righthand end thereof and the juncture 82. The primary windings 104 and 106 of the current transformer link the core 102 such that currents through them produce additive magnetic effects or fluxes which are additive or in aiding relation.

As shown in the drawing, the current transformer 100 includes a secondary winding 108 wound on the core 102. Secondary winding 108 has one end grounded to the casing 12 by a transformer grounding terminal 110 and its other end connected to an internal transformer or bushing terminal 112 of a bushing 114 sealably mounted to the casing 12. Terminal 112 is connected by a conductor through insulating bushing 114 to an external metering circuit lead 116, the lead 116 being connected to an external bushing terminal 117 of bushing 114. Lead 116 is connected to one end of a current winding 118 of the watt-hour meter 98. The other end of current winding 118 is grounded, such as by a lead 119 connected to the grounded bushing terminal 37, to thereby complete the current winding circuit of the watt-hour meter. The watt-hour meter has its voltage winding, indicated at 120, connected across external bushing terminals 93 and 94 of the additional load circuit 95 by means of leads 122 and 124.

The primaries 104 and 106 may be provided by passing secondary winding leads 66 and 70 through the window of core 102 one or more times. The number of turns in the current transformer primaries 104 and 106, as well as in secondary 108, will depend, of course, upon the desired turns ratio of the current transformer and the particular rating and type of watt-hour meter used, as will be apparent to those skilled in the art.

Since the additional load circuit 95 is connected between terminals or junction points 78 and 82, current flowing in load circuit 95 flows also in primary windings 104 and 106 of the current transformer. As can be seen from the drawing, current transformer primary 104 is in series with all loads connected across the series connected winding sections 26 and 28, as well as being in series with any load connected across winding section 26 alone. Similarly, primary 106 is in series with all loads connected across the series connected winding sections 26 and 28, as well as being in series with any load connected across winding section 28 alone. Thus, with the primaries 104 and 106 connected as shown, the current transformer will be responsive to current flowing in the parallel connected load circuits 53 and 95. With this arrangement, voltage induced in the secondary winding 108 of the current transformer and the current flowing in the current winding 118 of the watt-hour meter will be proportional to the vector sum of the currents flowing in secondary winding sections 26 and 28 so that the watt-hour meter will properly meter the total watt-hours delivered by the transformer, in this case, the watt-hours consumed by all the loads in both the main and additional load circuits 53 and 95. Thus, if the voltage winding 120 of the watt-hour meter is connected across the additional load circuit 95 as shown in the drawing, the meter will register the total watt-hours consumed by both main and additional load circuits 53 and 95, and will continue to meter the watt-hours consumed by load circuit 95 even if circuit breaker 54 disconnects main load circuit 53 from the transformer.

If desired, lead 76 may be connected to a circuit point between bimetal element 60 and switch contacts 56 instead of the juncture 78, and with lead 80 connected to a point between bimetal element 62 and contacts 58 instead of to juncture 82. With such connections, the bimetal elements are made responsive to the currents flowing in both the main and additional load circuits.

Where it is desired to supply the voltage of only one of the secondary winding sections to the load circuit 95, the load may be connected between one of the leads 91 and 92 and ground or the neutral lead 38. The additional load circuit may, of course, be provided with a ground or neutral connection to provide three-wire electric service where desired. Also, an additional circuit breaker may be connected in series with additional load circuit 95 in order to protect the transformer against overloads in this load circuit.

While a single-phase transformer having two secondary winding sections or coils 26 and 28 is shown in the drawing, other arrangements may be used in accordance with the present invention. Each of the winding sections 26 and 28 may consist of one or a number of winding coils connected in series or parallel depending upon the particular transformer design.

It will now be apparent that the transformer apparatus described and illustrated herein maintains the supply of power to the additional load circuit 95 even if the internally connected circuit breaker 54 disconnects the main load circuit 53 from the transformer. In this way, the advantages of an internally connected circuit breaker may be obtained while providing uninterrupted electrical service to an additional load circuit. At the same time, the installation of the transformer is simplified since the additional load circuit can be connected directly to transformer terminals, such as terminals 93 and 94, provided by the transformer. This eliminates the need of special connections and mountings external to the transformer. Also, only simple connections are required for metering the total watt-hours consumed by both load circuits, and only one watt-hour meter is required for this purpose. The transformer apparatus of the present invention is thus very simple to install requiring but a minimum number of connections which results in savings in installation time and cost.

It is to be understood that the foregoing description and accompanying drawing has been given only by way of illustration and example and that changes and alterations in the present disclosure which will be readily apparent to one skilled in the art are contemplated as within the scope of the present invention which is limited only by the claims which follow.

What is claimed is:

1. A transformer apparatus for supplying power to a first load circuit and to a preselected load circuit requiring uninterrupted power irrespective of the interruption of power to said first load circuit comprising a transformer casing, a winding in the casing, a pair of transformer terminals for connection to said first load circuit, one end of said winding being coupled to one of said terminals, the other end of said winding being connected to a junction point, a circuit interrupting device in said casing including a normally closed switch and condition responsive means adapted to actuate said switch to its open position upon the occurrence of a predetermined condition, said switch being connected between said junction point and the other of said transformer terminals, other transformer terminals for connection to said preselected load circuit, connection means in said casing connecting said other transformer terminals to said winding including a connection between one of said other terminals and said junction point whereby said other terminals are provided an uninterrupted supply of power irrespective of the interruption of the supply of power to said transformer terminals when said normally closed switch is actuated to its open position.

2. An electrical transformer for supplying power to a first load circuit and to a preselected load circuit requiring uninterrupted power irrespective of the interruption of power to said first load circuit comprising a transformer casing, a transformer winding in the casing and including a plurality of winding sections, a first set of transformer terminals for connection with said first load circuit, means coupling said winding sections to said first set of terminals for supplying power to said first load circuit, circuit interrupting means in said casing connected in series with one of said winding sections and disposed between one end of said one winding section and one of said terminals, means for actuating said circuit interrupting means to disconnect said one terminal from said one winding in response to a predetermined condition, a second set of transformer terminals for connection with said preselected load circuit, and means connecting at least one of said second set of terminals to said one winding section at a circuit point between said one end of said one winding section and said circuit interrupting means to receive an uninterrupted supply of power irrespective of the interruption of the supply of power to said first set of terminals.

3. In a transformer including a transformer casing, a winding in said casing, said winding including a pair of winding sections, three transformer terminals for connection to a first load circuit, one end of each of said winding sections being connected to one of said terminals, the other ends of said winding sections being connected respectively to the other two of said terminals, circuit interrupting means in said casing including a pair of switches, said switches being connected respectively in series with said winding sections between the winding sections and their associated terminals, means for actuating at least one of said switches upon the occurrence of predetermined conditions to interrupt the supply of power from said winding sections to their associated terminals, the combination therewith comprising a pair of terminal means for connection to a preselected load circuit requiring an uninterrupted supply of power irrespective of the interruption of the supply of power to said first load circuit, and connection means in said casing connecting one of said terminal means to a circuit point between one of said winding sections and its associated switch and connecting the other of said terminal means to a circuit point between the other of said winding sections and its associated switch whereby said terminal means are provided an uninterrupted supply of power irrespective of the interruption of the supply of power from said winding sections to their associated transformer terminals upon actuation of said circuit interrupting means.

4. In a transformer including a transformer casing, a winding in said casing, said winding including a pair of winding sections, first, second and third transformer bushings mounted on said casing and each having a connection terminal, said terminals of said bushings being adapted for connection to a first load circuit, means for connecting one end of both of said winding sections to the terminal of said first bushing, means connecting the other ends of said winding sections respectively to a pair of junction points, circuit interrupting means in said casing including a pair of normally closed switches, and condition responsive means for actuating said switches to their open position upon the occurrence of a predetermined condition, one of said switches being connected between one of said junction points and the terminal of said second bushing, the other of said switches being connected between the other of said junction points and the terminal of said third bushing, the combination therewith comprising fourth and fifth transformer bushings mounted on the casing for connection with a preselected load circuit requiring an uninterrupted supply of power irrespective of the interruption of power supplied to said first load circuit, said fourth and fifth transformer bushings each having a connection terminal, and connection means connecting the terminals of said fourth and fifth bushings to said junction points, respectively, whereby uninterrupted power is supplied from said winding to said fourth and fifth bushings for said preselected load circuit when said switches are actuated to their open positions.

5. An electrical transformer apparatus for supplying power to a first load circuit and to a preselected load circuit requiring uninterrupted power irrespective of the interruption of power to said first load circuit comprising a casing, a transformer winding in said casing, transformer bushing means on said casing and connected to said winding for supplying power to said first load circuit, means connected between said transformer bushing means and said winding for interrupting the supply of power to said first load circuit in response to predetermined conditions, means including at least one other transformer bushing means on said casing and connected to said winding for supplying power to said preselected load circuit irrespective of the interruption of the supply of power to said first load circuit, current responsive means in said casing and connected with said winding for producing a current responsive to the current flowing in said preselected load circuit and/or said first load circuit, and means for coupling said current responsive means to a power measuring circuit.

6. An electrical transformer apparatus for supplying power to a first load circuit and to a preselected load circuit requiring uninterrupted power irrespective to the interruption of power to said first load circuit comprising interruption of power to said first load circuit comprising a casing, a transformer winding in said casing, transformer terminals for connection to a first load circuit, means coupling said terminals to said winding for supplying power to said first load circuit, at least one other transformer terminal for connection to said preselected load circuit, connection means connecting said other transformer terminal to said winding for supplying power to said second load circuit irrespective of the interruption of the supply of power to said first load circuit, a circuit interrupting device connected with said winding and at least one of said first named terminals for interrupting the flow of current in said first load circuit in response to a predetermined condition, current responsive means in said casing including means connected in series with each of said load circuits for producing a current responsive to the current flowing in said load circuits, and other means adapted to connect said responsive means to a power measuring circuit externally of said casing.

7. In combination, an electrical transformer for supplying power to a first load circuit and to a preselected load circuit requiring uninterrupted power irrespective of the interruption of power to said first load circuit comprising a transformer casing, a transformer winding in said casing, transformer terminals for connection with said transformer winding and said first load circuit, a circuit interrupting device connected in series between said transformer winding and said first load circuit for interrupting the flow of current to said first load circuit in response to a predetermined condition, means for supplying power to said preselected load circuit irrespective of the interruption of the supply of power to said first load circuit including transformer terminal means connected to said transformer winding in by-passing relation with said circuit interrupting means, a current transformer in said casing having primary and secondary winding means, said primary winding means being connected with said transformer winding and responsive to the current flowing in said first load circuit and/or said preselected load circuit, and means for connecting said secondary winding means with a metering circuit external of said casing.

8. In combination, an electrical transformer apparatus for supplying power to a first load circuit and to a preselected load circuit requiring uninterrupted power irrespective of the interruption of power to said first load circuit comprising a transformer casing, a transformer winding in said casing, a pair of transformer terminals adapted for connection to said first load circuit, a normally closed circuit interrupting device in said casing, means coupling one end of said winding to one of said terminals, means coupling the other end of said winding to the other of said pair of terminals through said device, condition responsive means for actuating said device to interrupt the flow of current in said first load circuit in response to a predetermined condition, terminal means adapted for connection to said preselected load circuit, means connecting said terminal means to said winding including a connection between a junction joint between said winding and said device for supplying power to said preselected load circuit irrespective of the interruption of the supply of power to said first load circuit, current responsive means in said casing connected in series with said winding and responsive to the current flowing in each of said load circuits, and means for coupling said current responsive means to a current winding of a watt-hour metering circuit for metering the watt-hours consumed by both of said load circuits.

9. In combination, an electrical transformer for supplying power to a first load circuit and to a preselected load circuit requiring uninterrupted power irrespective of the interruption of power to said first load circuit comprising a transformer casing, a transformer winding in said casing, transformer terminals for connection with said transformer winding and said first load circuit, a circuit interrupting device in said casing coupled in series circuit relation with said transformer winding for interrupting the flow of current to said first load circuit in response to a predetermined condition, means for supplying power to said preselected load circuit irrespective of the interruption of the supply of power to said first load circuit including transformer terminal means connected to a junction point between said device and said transformer winding, a current transformer in said casing having primary and secondary winding means, said primary winding means including a primary winding coupled in series circuit relation with said transformer winding between said junction point and said transformer winding for inducing a voltage in said secondary winding means responsive to current flowing in each of said load circuits, and means for coupling said secondary winding means to a watt-hour metering circuit.

10. In a transformer for supplying power to a main load circuit and to a preselected load circuit requiring uninterrupted power irrespective of the interruption of power to said main load circuit, a transformer casing, a winding in said casing, said winding including a pair of winding sections, three transformer terminals for connection to said main load circuit, one end of each of said winding sections being connected to one of said transformer terminals, the other ends of said winding sections being connected respectively to the other two of said transformer terminals, circuit interrupting means in said casing including a pair of switches, and means for actuating at least one of said switches in response to a predetermined condition, said switches being connected respectively in series with said winding sections between the winding sections and their associated transformer terminals, a pair of transformer terminals for connection to said preselected load circuit, connection means in said casing respectively connecting said pair of terminals to circuit points between said winding sections and associated switches for supplying power to said preselected load circuit irrespective of power interruption to said main load circuit by said circuit interrupting means, a current responsive device in said casing including means connected in series with each of said winding sections for producing a current responsive to the sum of the currents flowing in said winding sections, and means for coupling said current responsive device with a current winding of a watt-hour meter externally of said casing.

11. In a transformer, a transformer casing, a winding in said casing, said winding including a pair of winding sections, three transformer terminals adapted for connection to a main load circuit, one end of each of said winding sections being connected to one of said transformer terminals, the other ends of said winding sections being connected respectively to the other two of said transformer terminals, circuit interrupting means in said casing including a pair of switches, and means for actuating at least one of said switches in response to a predetermined condition, said switches being connected respectively in series with said winding sections between the winding sections and one of their associated transformer terminals, a pair of transformer terminals adapted for connection to an additional load circuit, connection means in said casing respectively connecting said pair of terminals to circuit points between said winding sections and associated switches, a current transformer in said casing including a pair of primary winding means, and secondary winding means, one of said primary winding means being coupled in series with one of said winding sections between said one transformer terminal and the switch associated with that winding section, the other of said primary winding means being coupled in series with the other of said winding sections between said one transformer terminal and the switch associated with that winding section, and means for coupling said secondary winding means to a current winding of a watt-hour meter.

12. In combination, a transformer comprising a transformer casing, a transformer winding in said casing including a pair of winding sections, first, second and third transformer bushings mounted to said casing and each having a terminal, said terminals of said bushings being adapted for connection to a first load circuit, means for connecting one end of both of said winding sections to the terminal of said first bushing, means connecting the other ends of said winding sections respectively to a pair of junction points, circuit interrupting means in said casing including a pair of normally closed switches, and condition responsive means for actuating said switches upon the occurrence of a predetermined condition, one of said switches being connected between one of said junction points and the terminal of said second bushing, the other of said switches being connected between the other of said junction points and the terminal of said third bushing, fourth and fifth transformer bushings mounted to the casing and each having a terminal, said terminals of said fourth and fifth bushings being adapted for connection to a second load circuit, connection means in said casing connecting the terminals of said fourth and fifth bushings to said junction points respectively so that power is supplied to said second load circuit independently of said switches, a current transformer in said casing having primary and secondary winding means, said primary winding means including a pair of windings connected in series with said winding sections, and means for coupling said secondary winding means to a watt-hour meter circuit for measuring the watt-hours consumed by both of said load circuits.

13. In combination, an electrical transformer comprising, a transformer core having primary and secondary windings thereon in said casing, means for coupling said primary winding to a voltage source, said secondary winding including a pair of winding sections, first, second and third transformer terminals for connection to a first load circuit, circuit interrupting means in said casing including a pair of normally closed switches, and switch actuating means for opening at least one of said switches in response to a predetermined condition, means connecting one of said winding sections and one of said switches in series to form a first series circuit, means coupling said first series circuit between said first and second terminals, means connecting the other of said winding sections and the other of said switches in series to form a second series circuit, means coupling said second series circuit between said second and third terminals, fourth and fifth transformer terminals for connection to a second load circuit, connection means in said casing coupling said fourth terminal to a circuit point between the switch and winding section of said first series circuit, connection means in said casing connecting said fifth terminal to a circuit point between the switch and winding section in said second series circuit, a current transformer having first and second primary means, and secondary winding means, said first primary winding means being connected in said first series circuit and responsive to the total current flowing in the winding section of that series circuit, said second primary winding means being connected in said second series circuit and responsive to the total current flowing in the winding section of that series circuit, and transformer terminal means for coupling said secondary winding means to a current winding of a watt-hour meter circuit for metering the total watt-hours consumed by said load circuits.

14. In an electrical power supply system, a transformer comprising a casing, a dielectric fluid in said casing, a core having primary and secondary windings thereon disposed in said fluid, means coupling said primary winding to a voltage source, said secondary winding including a pair of winding sections, a circuit breaker in said casing including first and second normally closed circuit interrupting switches, and switch actuating means including means responsive to the temperature of said fluid for actuating said switches to their open position in response to a predetermined condition, three transformer terminals insulatingly mounted to said casing and connected to a dual voltage load circuit, means in said casing coupling one end of each of said winding sections to one of said terminals, means coupling each of said switches between one of the other ends of said winding sections and one of the other two of said terminals, an additional pair of transformer terminals insulatingly mounted to said casing and connected to an additional load circuit, means in said casing respectively connecting said pair of terminals to circuit points located between said other ends of said winding sections and their associated switches for supplying power to said additional load circuit independently of said circuit breaker, a watt-hour meter having current and voltage windings for metering the watt-hours consumed by said load circuits, a current transformer in said casing including a core having primary and secondary winding means linking the core, said primary winding means including a primary winding connected in series with each of said winding sections, means including another transformer terminal insulatingly mounted to said casing for coupling said secondary winding means to said current winding of said watt-hour meter, and means for connecting said voltage winding of said watt-hour meter between said pair of terminals.

15. An electrical transformer for supplying power to a first load circuit and to a preselected load circuit requiring uninterrupted power irrespective of the interruption of power to said first load circuit comprising a transformer casing, terminal means on said casing for connection with said first load circuit, winding means in said casing connected with said terminal means for supplying power thereto, circuit interrupting means connected between said winding means and terminal means and adapted to interrupt the supply of power therebetween in response to predetermined conditions, other terminal means on said casing for connection with said preselected load circuit, said other terminal means being connected between said winding means and circuit interrupting means to receive an uninterrupted supply of power from said winding means irrespective of the interruption of the supply of power from said winding means to said first named terminal means by said circuit interrupting means.

16. The electrical transformer according to claim 15 comprising means including means in said casing coupled with said winding for measuring the power supplied to said first load circuit and/or said preselected load circuit.

17. The electrical transformer according to claim 15 including current transformer means in said casing coupled with said winding and with a power measuring circuit to normally measure the power supplied to said first named terminal means and other terminal means and to measure the power supplied only to said other terminal means when said circuit interrupting means interrupts the supply of power to said first named terminal means.

18. The electrical transformer according to claim 17 wherein said power measuring circuit includes a watt-hour meter, and means for serially connecting said transformer means with said winding for supplying a voltage responsive to the current flowing in said winding to said watt-hour meter.

References Cited in the file of this patent
UNITED STATES PATENTS

| | | |
|---|---|---|
| 2,066,935 | Hodnette | Jan. 5, 1937 |
| 2,681,436 | Schleicher | June 15, 1954 |
| 2,736,009 | Barnickel | Feb. 21, 1956 |

UNITED STATES PATENT OFFICE
CERTIFICATE OF CORRECTION

Patent No. 3,106,664                            October 8, 1963

Howard B. Keath

It is hereby certified that error appears in the above numbered patent requiring correction and that the said Letters Patent should read as corrected below.

Column 8, line 56, for "joint" read -- point --; column 10, line 29, after "ing" and before the comma, insert -- a casing --.

Signed and sealed this 12th day of May 1964.

(SEAL)
Attest:
ERNEST W. SWIDER

Attesting Officer

EDWARD J. BRENNER
Commissioner of Patents